US007144067B2

United States Patent
Gramss

(10) Patent No.: US 7,144,067 B2
(45) Date of Patent: Dec. 5, 2006

(54) ARM REST FOR A DOOR PANELING OF AN AUTOMOBILE

(75) Inventor: Rainer Gramss, Iserlohn (DE)

(73) Assignee: ITW Automotive Products GmbH & Co. KG, Iserlohn (DE)

(*) Notice: Subject to any disclaimer, the term of this patent is extended or adjusted under 35 U.S.C. 154(b) by 47 days.

(21) Appl. No.: 11/011,374

(22) Filed: Dec. 15, 2004

(65) Prior Publication Data

US 2005/0134085 A1 Jun. 23, 2005

(30) Foreign Application Priority Data

Dec. 17, 2003 (DE) ............... 103 59 191

(51) Int. Cl.
*B60J 9/00* (2006.01)

(52) U.S. Cl. ............ 296/153; 296/1.09; 297/115; 297/411.2; 297/411.22

(58) Field of Classification Search ............ 296/153, 296/152, 1.09; 297/115, 411.2, 411.22, 411.31
See application file for complete search history.

(56) References Cited

FOREIGN PATENT DOCUMENTS

| DE | 2 253 819 | 5/1974 |
|---|---|---|
| DE | 41 35 279 | 4/1993 |
| DE | 39 30 270 | 7/1993 |
| DE | 101 04 077 | 8/2002 |
| EP | 516257 | 12/1939 |
| EP | 0 669 222 | 4/1998 |
| EP | 0 854 064 | 7/1998 |
| EP | 1256484 | 11/2002 |

*Primary Examiner*—Lori L. Coletta
(74) *Attorney, Agent, or Firm*—Lowe Hauptman & Berner, LLP

(57) ABSTRACT

An arm rest for a door paneling in automobiles, whereby a support member for an arm rest padding has an elongated guiding member at the lower side, the guide member being liftable in guide means, the guide means being fastened to the paneling, in that further locking means for the guide member and the guide means are provided in order lock the guide member in different elevated positions in the guide means and that an actuation element is provided to release the locking means and to allow displacement of the arm rest padding.

16 Claims, 4 Drawing Sheets

ARM REST FOR A DOOR PANELING OF AN AUTOMOBILE

RELATED APPLICATIONS

The present application is based on, and claims priority from, German Application Number 103 59 191.5, filed Dec. 17, 2003, the disclosure of which is hereby incorporated by reference herein in its entirety.

FIELD OF THE INVENTION

The invention relates to an arm rest for a door paneling of an automobile according to claim 1.

BACKGROUND OF THE INVENTION

The inside of the doors of an automobile or the inside paneling laterally next to a seat usually has mounted therein an arm rest. Next to the driver or front-seat passenger, the arm rest mostly includes control elements such as window lifts, external mirrors or the like for individual functions. The control elements are designed as keys in most cases.

The arm rests are fixedly mounted and mostly are integrated in the door paneling. However, persons sitting in the vehicle are of heights which differ widely from each other in some cases. It is further known to make adjustable the height of a seat in an automobile. Therefore, in either case, it might happen that the arm rest cannot be used at all or cannot to an optimum.

SUMMARY OF THE INVENTION

It is the object of the invention to provide an arm rest which can be optimally used regardless of the body height or height of the seat.

The object is achieved by the features of claim 1.

In the invention, a support member for an arm rest padding is configured to be adjustable in height. It has an elongated guide member which is guided to be adjustable in height in a guide means in the door paneling. Further, locking means are provided for the guide member and the guide means that allow to lock the support member and, hence, the arm rest padding in place at certain height positions. The locking means are operated by an actuation element. Therefore, it is possible for the operator by simply operating the actuation element, e.g. by pressing a button, to release the locking means and to set the arm rest padding to a desired position which matches the height of the body or height of the seat.

According to an aspect of the invention, biasing means are provided to bias the support member towards an elevated position. The biasing means make it unnecessary to manually extract the support member from the guide means if the arm rest padding is to be adjusted upwards. In particular, if the arm rest padding is in its lowermost position and finishes flush with the adjoining portions of the door paneling it would be somewhat troublesome to adjust the arm rest padding upwards with no physical effort.

According to another aspect of the invention, the guide member the guide means are designed such that the arm rest padding is gradually moved towards the interior of the automobile with the increasing elevation of the arm rest padding. Thus, for instance, the guide means can be formed obliquely or the guide member is suitably bent to obtain the described movement path for the arm rest padding.

Various possible options are conceivable to configure the guide member and guide means. Therefore, an aspect of the invention provides for the guide member to have two approximately parallel guide rods which are guided in guiding channels of the guide means. The guide rods and guiding channels can be rectangular in cross-section. However, it is also imaginable to form the guide rods and guiding channels to be circular in cross-section.

It is also conceivable to form the locking means such that the support member can be locked in place in any elevated positions with respect to the paneling. According to an aspect of the invention, the locking means include latching means by which the guide rods can be locked in discrete elevated positions in the guiding channels. For an adjustment of the arm rest for drivers or front-seat passengers of differing heights and to allow a convenient seat position, it is sufficient for the arm rest padding to be adjusted in height by steps.

Various possible options are conceivable to latch the guide rods in the guide means. According to the invention, one consists in that the latching means include latch levers which are pivotally supported in the hollow guide rods and include a latch projection which cooperates with latch recesses in the guiding channels via an opening in the guide rod. The latch levers are biased towards the latching position by a spring.

To make it easier to operate the two latch levers, another aspect of the invention provides for the latch levers to be interconnected at the upper end by means of a transverse member to which the actuation element is connected.

According to another aspect of the invention, the guiding channels can be formed in a housing which is integrated in the door paneling.

BRIEF DESCRIPTION OF THE DRAWINGS

The invention will be described in greater detail below with reference to an embodiment shown in the drawings.

Referring to FIGS. 1 and 2, some part of a paneling is outlined at 10 at the inside of a vehicle door, i.e. specifically the left-hand front door of an automobile. The door paneling portion 10 which is shown has a trough-like indentation. The bottom of the indentation which extends approximately horizontally allows to recognize an opening 12 in which actuation elements (not shown) can be received for certain operational functions such as window lifts, external mirrors, etc. The control elements are omitted here. The same applies to an opening 14 which is formed below the bottom of the indentation in a vertical portion of the paneling portion 10.

DETAILED DESCRIPTION OF PREFERRED EMBODIMENTS

Figure 1:
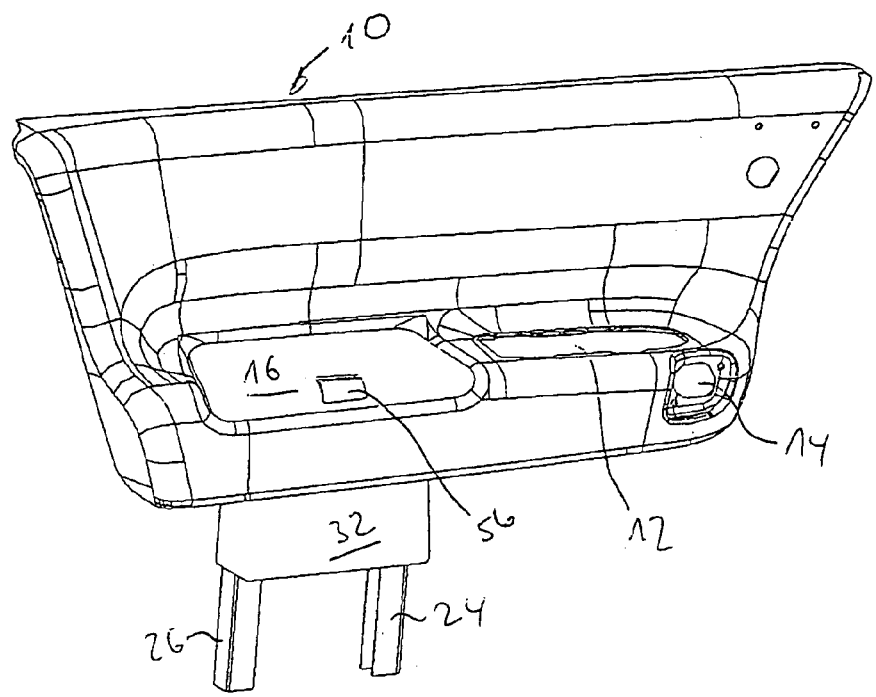
FIG. 1 shows some part of the door paneling of an automobile with an arm rest of the invention in a perspective view.

In FIG. 1, for the rest, the bottom of the indentation is defined by the upper side of an arm rest padding 16 on which the driver can support his left-hand forearm, specifically his elbow. The arm rest padding 16 is elevated in FIG. 2. As will be described hereinafter the arm rest padding 16 can be set to different heights to allow for an accommodation to the height of the driver and/or the height of the seat.

Figure 3:
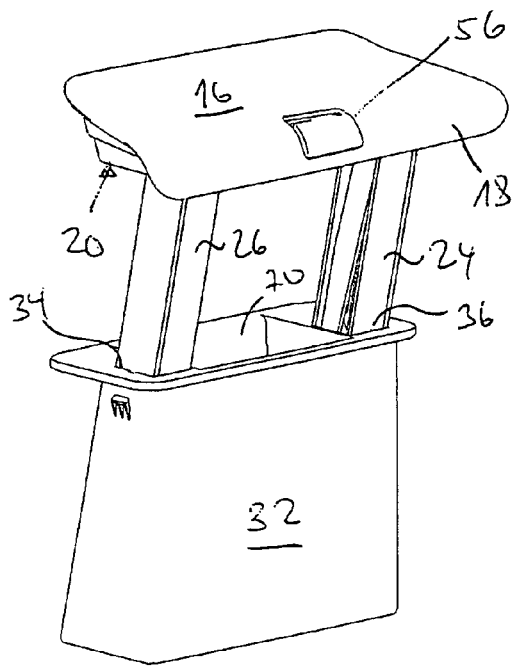
FIG. 3 shows the arm rest according to the invention in a perspective view, with a guide means with no door paneling.

In FIG. 3, the arm rest padding 16 is illustrated in detail. It has a substantially horizontal upper side which is shown at 18 as being slightly oblique towards the inside of the automobile which is not shown, for the rest. The arm rest padding 16 is located on a support member 20 which can be seen more accurately in FIGS. 4 to 8. The support member 20 is plate-shaped with the substantially flat upper side extending approximately horizontally. As can be seen from FIG. 4 the edges of the plate-shaped support member 20 are bent upwardly at three sides as is illustrated at 22. No bent-up edge is provided merely towards the interior. The lower side of the plate-shaped support member 20 has mounted therewith two parallel guide rods 24, 26 arranged at a spacing which are rectangular in cross-section. The guide rods 24, 26 are guided in guiding channels of a housing 32. The guiding channels are outlined at 34 and 36, respectively. The guiding channels 34, 36 are also rectangular in cross-section and house the guide rods 24, 26 approximately fittingly. The guiding channels 34, 36 are slightly inclined relative to the vertical line. As a result, the padding 16 moves the more to the interior of the vehicle the more it is elevated.

Figure 5:
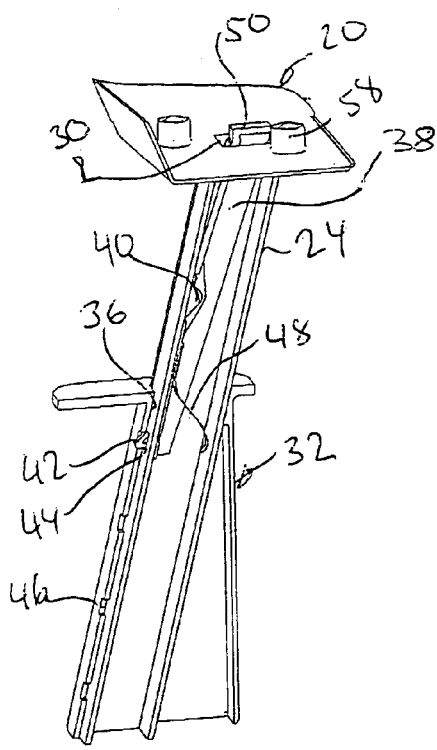
FIG. 5 shows a section through the representation of FIG. 3 in a perspective view.

The hollow guide rods have disposed therein a latch lever 38 each which is pivotally supported between its ends. In FIG. 5, a pillow block is outlined at 40. At the lower end, the latch lever 38 has a latch projection 42 which extends to the outside through an opening 44 in the guide rod 24. In the area of the guiding channels 34, 36, the housing 32 has latch apertures 46 spaced in height which are designed to be engaged by the latch projection 42. The latch lever 38 is biased in the latching direction by means of a spring 48 which is connected to the latch lever 48 at one end and is supported on the opposite wall of the guide rod 24 at the other end.

The upper end 50 of the latch lever 38 extends through an opening 28 and 30 (FIG. 6) of the support member 20. The openings 28 and 30 are larger than is the extent of the end 50 in a horizontal direction.

Figure 6:
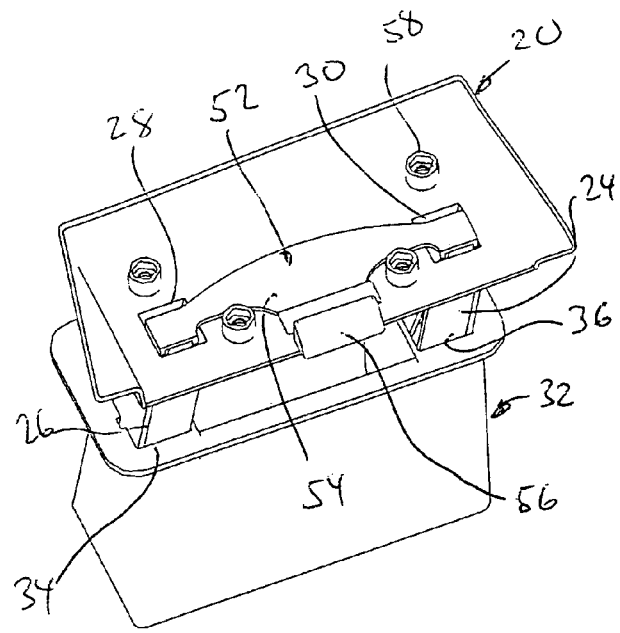
FIG. 6 shows a plan view of the representation of FIG. 4 in a perspective view.

As is apparent from FIG. 6 the upper ends 50 of the latch levers 38 are interconnected at the upper side of the support member 20 via a flat transverse member 52. The transverse member substantially rests on the flat upper side of the support member 20. Approximately in the center between the ends of the interconnecting transverse member 52, a lateral extension 54 is formed which is connected to a key-like actuation element 56. As ensues from FIGS. 1 to 3 the actuation element 56 protrudes somewhat in the area 18 of the arm rest padding 16. When a pressure is applied to the actuation element 56 in a horizontal direction the interconnecting transverse member 52 will thereby be displaced approximately horizontally while pivoting the two latch levers 38 so as to pivot the latch levers 38 in an anti-clockwise direction (FIG. 5), namely against the force of the spring 48. As a result, the projection 42 of the latch levers 38 gets out of the associated aperture 46 in the guiding channel. This makes it possible to elevate or lower the arm rest padding 16 and to bring it to a position in which it can be locked in another aperture 46.

Figure 7:
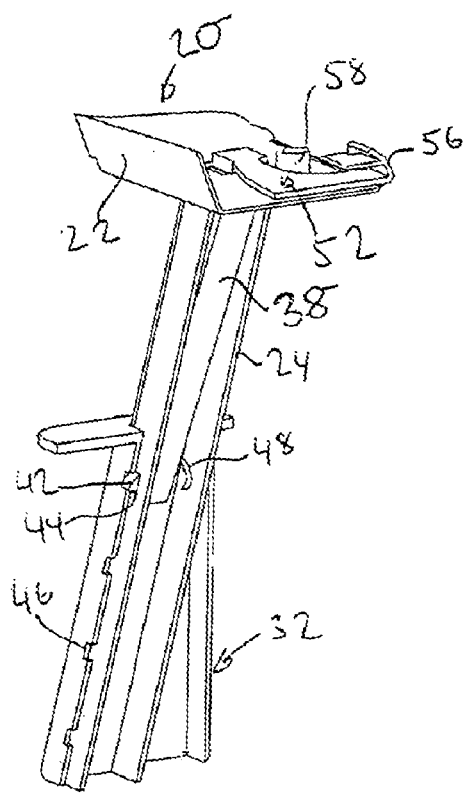
FIG. 7 shows a representation similar to FIG. 5 with an outlined interconnecting transverse member for the latch levers.
Figure 8:
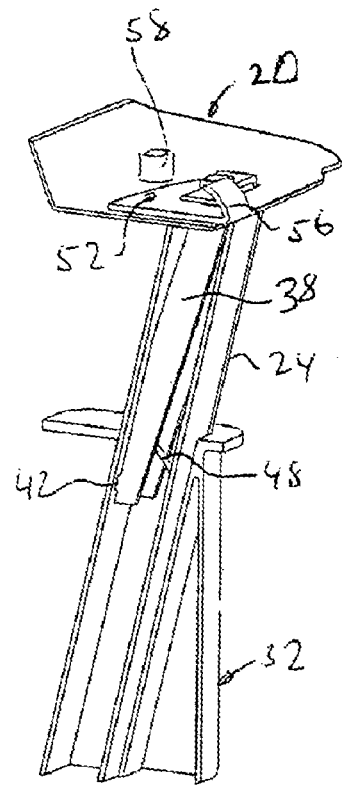
FIG. 8 shows a representation similar to FIG. 7, but as turned through an angle.

As is obvious from FIGS. 5, 7, and 8 the guide rods 24, 26 can be of a U shape in cross-section. The locking levers 28 can also be of a U shape in cross-section (FIG. 8) where the spring 48 can be fixed within the channel of the latch lever 28.

Elevations 58 which are circular in cross-section can be seen at the upper side of the support member 20. They serve for mounting the padding 16, e.g. by means of screws or the like.

Figure 2:
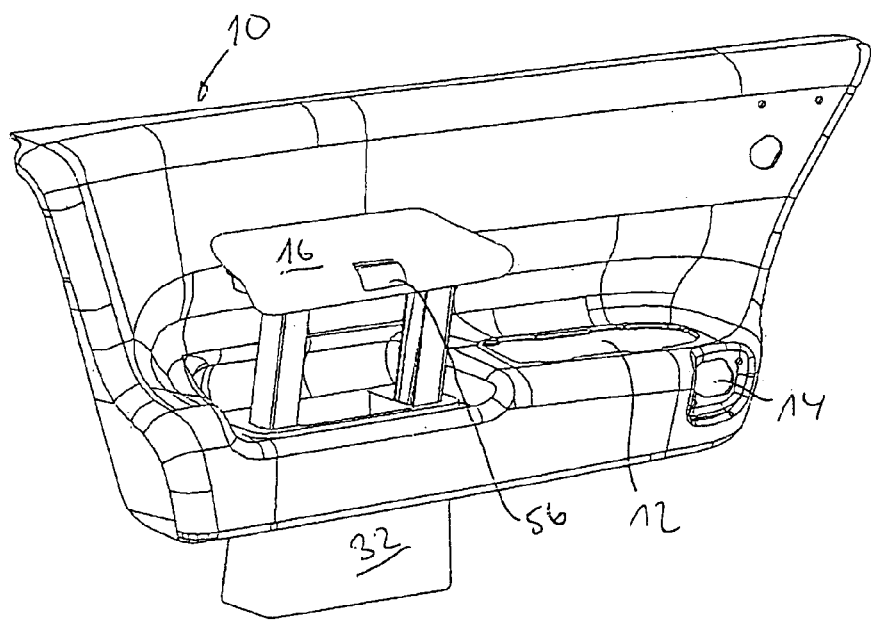
FIG. 2 shows a representation similar to that of FIG. 1, but with the arm rest elevated.

As is evident from FIGS. 1 and 2 the housing 32 is integrated in the door paneling.

Figure 9:
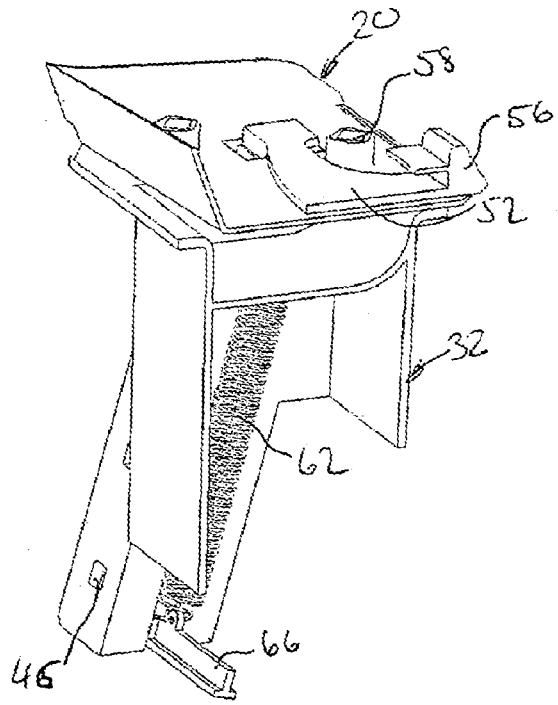
FIG. 9 shows a representation similar to FIG. 7, but with a biasing spring.
Figure 10:
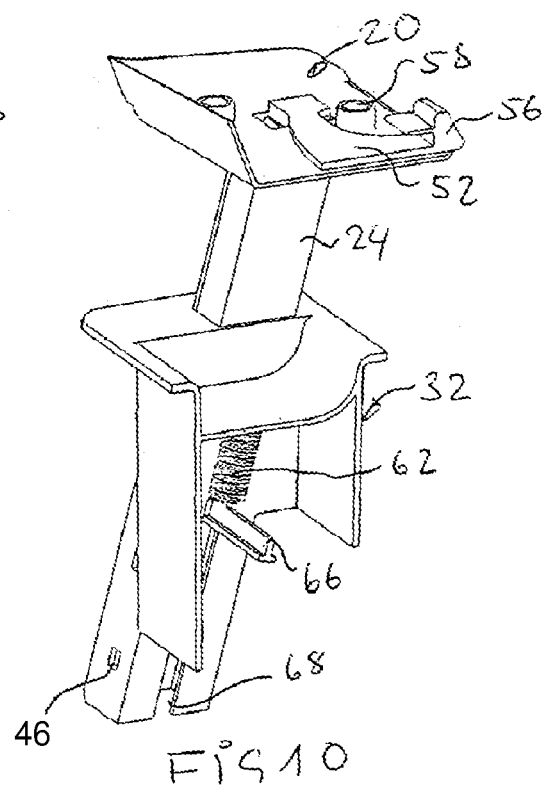
FIG. 10 shows the same representation as FIG. 9, but with the support member in an extracted position.
Figure 11:
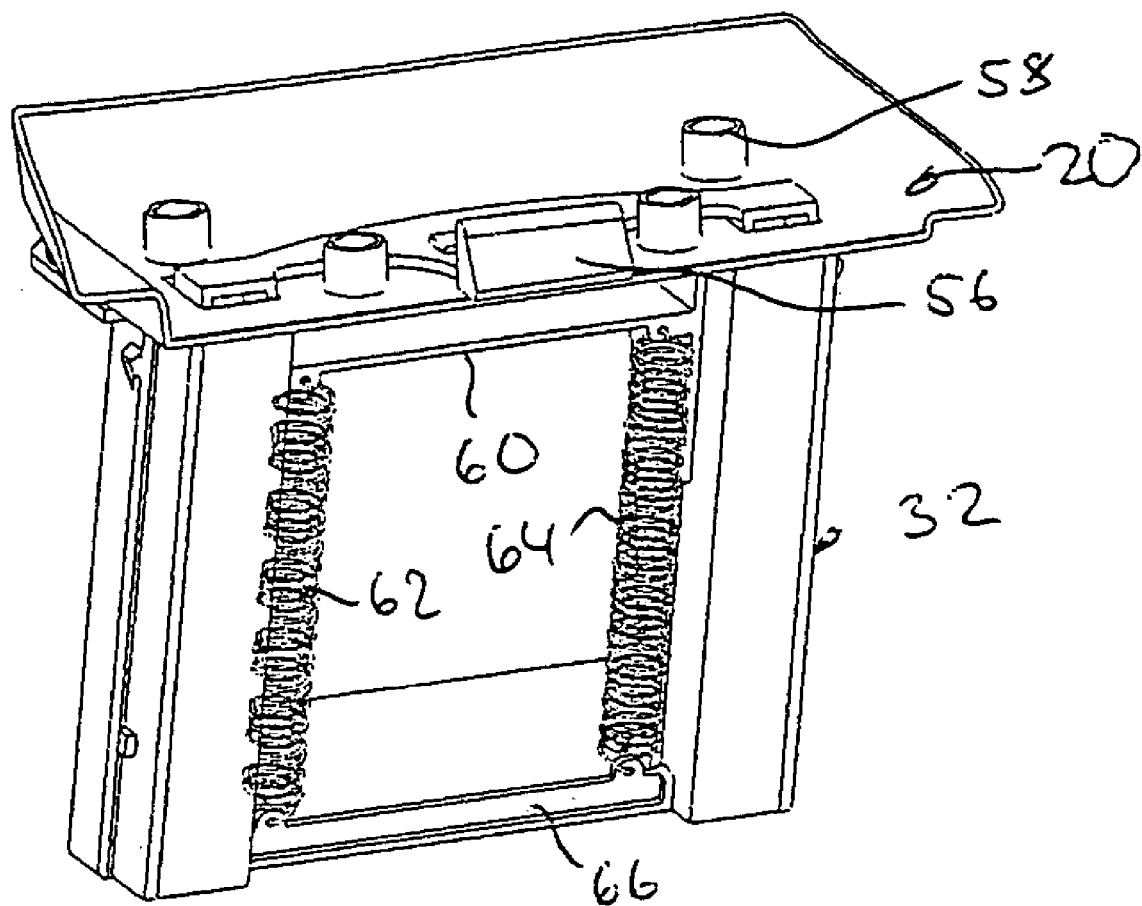
FIG. 11 shows the front side of the support member, guide means, and biasing springs of FIGS. 9 and 10 in a perspective view.

In FIGS. 9 to 11, the reference numbers used are the same as those of the other Figures as far as identical parts are illustrated. No further reference will be made to such parts below.

It can be seen that the housing 32, below the support member 20, has provided therein a cross-web 60 the ends of which mount a tension spring 62 and 64, respectively. The other end of the tension springs 62, 64 is connected to a crossbar 66 which is connected to the ends of a guide rod 24 and 26, respectively. To allow for a connection of the crossbar 66 to the guide rods 24, 26 in the guiding channels the guiding channels present a longitudinal slot each one of which is shown at 68 in FIG. 10. The guide rods 24, 26 and the support member 20 are biased upwards by means of the springs 62, 64. The springs 62, 64 are biased to a maximum in the lowermost position of the support member 20 (FIG. 9).

Figure 4:
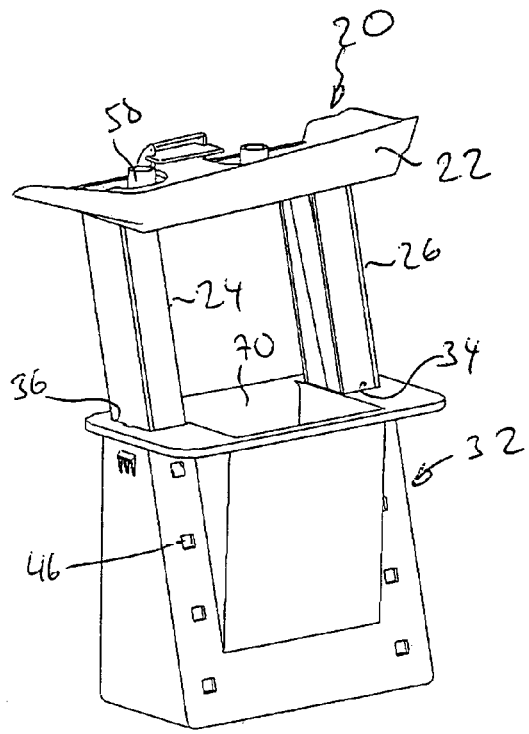
FIG. 4 shows a representation similar to FIG. 3, but with no arm rest padding and in a position turned through 180° with respect to FIG. 3.

As is apparent from FIGS. 3 and 4 there is a vacant space in the housing 32 between the guiding channels 34, 36 as can be seen at 70. For example, it can be utilized to keep minor-sized objects.

The invention claimed is:

1. An arm rest for a door paneling in automobiles, comprising:
    a support member for an arm rest padding having an elongated guide member at a lower side, the guide member being slidable in a guide element fastened to the paneling,
    a locking element for the guide member and the guide element provided to lock the guide member in different elevated positions in the guide element, and
    an actuation element provided in an accessible position in an upper surface of the arm rest padding and operable to release the locking element and to allow displacement of the arm rest padding.

2. The arm rest of claim 1, wherein a resilient biasing element is provided to bias the support member towards an elevated position.

3. An arm rest for a door paneling in automobiles, comprising:
    a support member for an arm rest padding having an elongated guide member at the lower side, the guide member being liftable in a guide element fastened to the paneling, a locking element for the guide member and the guide element provided in order to lock the guide member in different elevated positions in the guide element, and an actuation element provided to release the locking element and to allow displacement of the arm rest padding wherein the guide member and the guide element are designed such that the arm rest padding is gradually moved towards the interior of the automobile with increasing elevation of the arm rest padding.

4. The arm rest of claim 1, wherein the guide member includes two approximately parallel separate guide rods which are guided in guiding channels of the guide element.

5. The arm rest of claim 4, wherein the guide rods and the guide channels, respectively, are rectangular in cross section.

6. The arm rest of claim 4, wherein the locking element includes a latching element by which the guide rods can be locked in discrete elevated positions in the guide channels.

7. The arm rest of claim 6, wherein the latching element includes a latch levers which are pivotally supported in hollow guide rods, the latch levers including a latch projection which cooperates with latch recesses in the guiding channels, a spring biasing the latch lever towards the latching position.

8. The arm rest of claim 7, wherein the latch levers are interconnected by a transverse member at the upper ends of the latch levers, the actuation element being connected to the transverse member.

9. The arm rest of claim 4, wherein the guiding channels are formed in a housing which is integrated in the door paneling.

10. The arm rest claim 1, wherein the support member is plate-shaped and provided with an element at the upper side thereof for the attachment of the arm rest padding.

11. The arm rest of claim 8, wherein the transverse member is made of sheet material and adapted to slide on the upper side of the plate-shaped support member, and the actuation element is connected to a lateral extension between the ends of the transverse member.

12. The arm rest of claim 7, wherein the latch lever is supported for rotation by the guide rods between the ends of the latch lever.

13. The arm rest of claim 2, wherein the biasing spring is attached to the guide member.

14. The arm rest of claim 7, wherein each guide rod is engaged by a biasing spring.

15. The arm rest of claim 3, wherein the guide rods are slightly curved or are obliquely arranged, respectively.

16. An arm rest for a door paneling in automobiles, comprising:

a padded arm rest member supported on a slide structure and constantly biased to slide upward from a seated position to an elevated position; and means for selectively locking the padded arm rest member in positions selected from the seated positions and positions between the seated position and the elevated position, said selective locking means comprising an actuation element provided in an upper surface of the padded arm rest member, the actuation element being operatively connected with pivotal latch levers which have end portions that are engageable in apertures formed along a guiding channel forming part of the slide structure.

* * * * *